United States Patent
Navarre et al.

(10) Patent No.: US 6,205,482 B1
(45) Date of Patent: Mar. 20, 2001

(54) SYSTEM AND METHOD FOR EXECUTING A REQUEST FROM A CLIENT APPLICATION

(75) Inventors: Gloria Jean Navarre, Whitewater; Jakob de Haan, Waukesha, both of WI (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/026,201

(22) Filed: Feb. 19, 1998

(51) Int. Cl.$^7$ .................................................. G06F 15/16
(52) U.S. Cl. .................... 709/227; 709/202; 709/227; 709/203; 709/300; 707/3; 707/10; 707/103
(58) Field of Search ................................. 709/202, 300, 709/203, 227, 610; 707/3, 10, 103

(56) References Cited

U.S. PATENT DOCUMENTS

| | | |
|---|---|---|
| 5,187,787 | 2/1993 | Gkeen et al. ........................ 709/314 |
| 5,329,619 | 7/1994 | Page et al. ........................... 709/203 |
| 5,451,109 | 9/1995 | Bmynooghe et al. ................ 384/15 |
| 5,513,148 | 3/1997 | Bezviner et al. ..................... 703/26 |
| 5,590,334 | 12/1996 | Saulpaugh et al. .................. 473/514 |
| 5,596,744 | 1/1997 | Dao et al. ............................ 787/10 |
| 5,604,896 | 2/1997 | Duxubury et al. ................... 419/6 |
| 5,634,127 | * 5/1997 | Cloud .................................. 709/300 |
| 5,686,312 | 12/1996 | Johnson et al. ..................... 436/101 |
| 5,727,159 | 3/1998 | Kikinis ................................ 709/246 |
| 5,761,663 | * 5/1997 | Lagarde et al. ...................... 707/10 |
| 5,794,232 | * 3/1996 | Mahlum et al. ..................... 707/3 |
| 5,878,143 | 3/1999 | Moore .................................. 705/75 |
| 5,890,161 | 3/1999 | Helland et al. ...................... 707/103 |

OTHER PUBLICATIONS

Copy of the Search Report in the corresponding PCT Application; 1 page.

"Using Distributed OLTP$^2$ Technology in a High Performance Storage System", Terrill W. Tyler (IBM Government Systems) and David S. Fisher (Lawrence Livermore National Laboratory). http://www.computer.or...0095/fisher-.htm.

"OLTP Middleware Integrates Client and Server Applications", Dr. Bill Highleyman (NetWeave Corp.), http://www.xstar.cp,/carnot/Info/oltp.htm/.

"J.P. Morgan & Co. Incorporated Selects New Era of Networks To Develop and Implement its Event Explode Service Technology", Terry Truman, New Era of Networks (Neon) News. BW NewsOnDemand Plus, ©1997 Business Wire, Document 1511, Released 09/15/97, p. 1 of 1.

* cited by examiner

Primary Examiner—Moustafa M. Meky
Assistant Examiner—Hieu C. Le
(74) Attorney, Agent, or Firm—Brinks Hofer Gilson & Lione

(57) ABSTRACT

A system and method are provided for executing a request from a client application. Unlike conventional networks in which a client application transmits several data access transactions to several server applications, the client application of these preferred embodiments merely sends a single request to a gateway application, which converts the request into appropriate data access transactions. The preferred embodiments provide the advantage of allowing a client application to communicate with a plurality of server applications without knowing the server application's format or syntax requirements. Further, unlike environments in which a client application compiles data received from each contacted server application, in the environment of the preferred embodiments, the client application is presented with a single integrated response.

12 Claims, 4 Drawing Sheets

SYSTEM AND METHOD FOR EXECUTING A REQUEST FROM A CLIENT APPLICATION

TECHNICAL FIELD

The present invention relates generally to telecommunication services and more specifically to a new system and method for executing a request from a client application.

BACKGROUND

Client applications often are used to satisfy an information request requiring responses from a plurality of server applications. For example, a business frequently needs to know its daily sales from each of its divisions. To satisfy this information request, a client application contacts the server applications associated with each division to request sales activity. For each contacted server application, the client application negotiates access and executes a request for data (a "data access transaction"). Thus, to satisfy a single request, the client application transmits several data access transactions to several server applications.

To expedite the process of gathering information from several server applications, Electronic Data Interchange (EDI) standards were developed to provide standard message formats for common information or service requests between trading partners. To implement EDI standards in mature data processing environments, software components have been created to map an EDI message received from a client application to a format expected by an existing server application. Where additional data items used by an existing server application are not defined as standard fields in the EDI structure, the standard allows a "user data construct" to be populated with the non-standard data. Over time, the user data construct has become an increasingly important section of the EDI message. When a client application must communicate with many server applications, a data mapping process is usually required to format these non-standard items within the user data constructs used by each server application. One of the primary disadvantages associated with EDI standards is that once a server application changes the format of its user data construct in the EDI message, the client application may be unable to communicate with the server application until the data mapping process is updated. That is, networks using the EDI standard are release dependent. Because of the large and costly effort involved. changing the standard message format to incorporate the data items contained in the user data constructs or coordinating release dependent data processing changes between enterprises is not practical. There is, therefore, a need for an improved system and method for executing a request from a client application.

DETAILED DESCRIPTION OF THE PRESENTLY PREFERRED EMBODIMENTS

Figure 1:
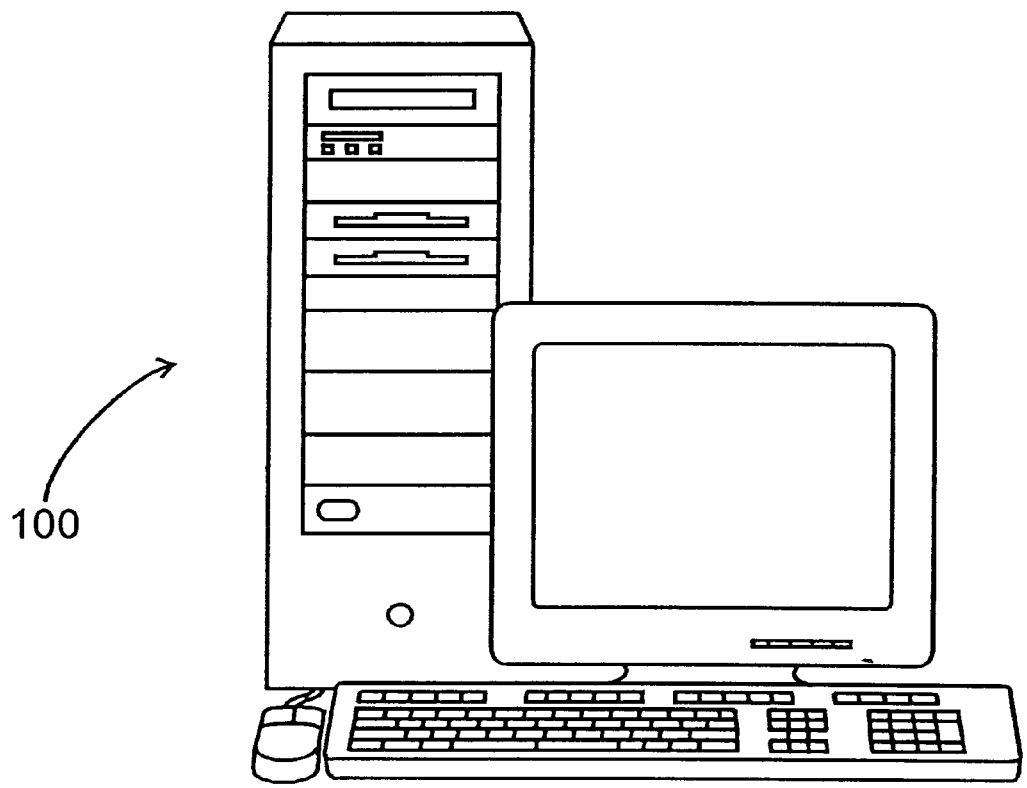
FIG. 1 is an illustration of a computer of a preferred embodiment.

In the embodiments described below, a system and method are presented for executing a request from a client application. Unlike conventional networks in which a client application transmits several data access transactions to several server applications, the client application of these preferred embodiments merely sends a single request to a gateway application (a "gateway"). The gateway, which can run on a computer 100 such as that shown in FIG. 1, accepts a single request from a client application and converts the request into the appropriate data access transactions, which are transmitted to targeted server applications. These embodiments provide the advantage of allowing a client application to communicate with a plurality of server applications without knowing their format or syntax requirements. That is, unlike environments that use fixed-format EDI standards, the environments described below are release independent. Further, unlike conventional environments in which a client application compiles data received from each contacted server application, these preferred embodiments provide the additional advantage of presenting a client application with a single integrated response to a single information request.

Figure 2:
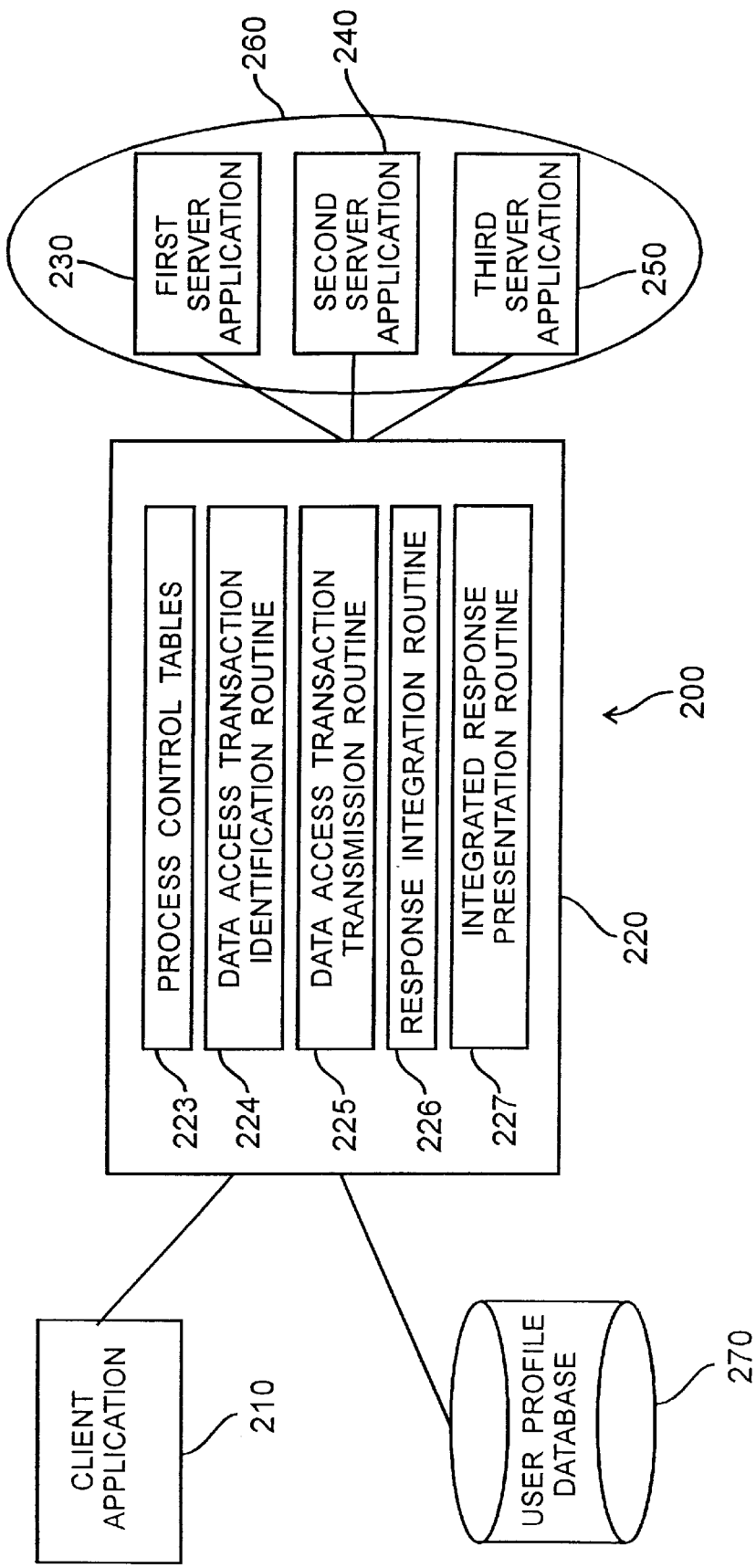
FIG. 2 is a block diagram of network of a preferred embodiment.

Turning again to the drawings, FIG. 2 is a block diagram of a network environment 200 of a preferred embodiment. As shown in FIG. 2, a client application 210 is coupled with a gateway 220, which is coupled with a user profile database 270 and first, second, and third server applications 230, 240, 250 in a host environment 260. As used herein, the term "coupled with" means directly coupled with or indirectly coupled with through one or more components. The gateway 220 comprises process control tables 223, a data access transaction identification routine 224, a data access transaction transmission routine 225, a response integration routine 226, and an integrated response presentation routine 227. While it is preferred that these routines be implemented with software and that the gateway 220 comprise the necessary hardware components (such as a CPU) to run the software, it is important to note that any appropriate hardware, analog or digital, and any appropriate software language can be used. Further, although these routines are shown as distinct elements in FIG. 2, the routines can be combined. It also is important to note that the components shown in FIG. 2 are presented merely for illustration and that more or fewer client and server applications than are shown can be used. Additionally, any of these routines can be located anywhere in the network 200.

With these components, the network 200 of FIG. 2 can be used in a method for executing a request from a client application. As shown in the flow chart of FIG. 3, this method comprises the steps of receiving a request from a client application (step 310), automatically identifying a set of data access transactions corresponding to the request, each data access transaction being associated with a respective server application (step 320), transmitting the set of data access transactions to the respective server applications (step 330), receiving a set of responses from the respective server applications, at least some of the set of responses comprising a respective first optional attribute (step 340), and integrating the set of responses for presentation to the client application even when the first optional attribute is not recognized (step 350). The operation of this method will be illustrated below.

Figure 3:
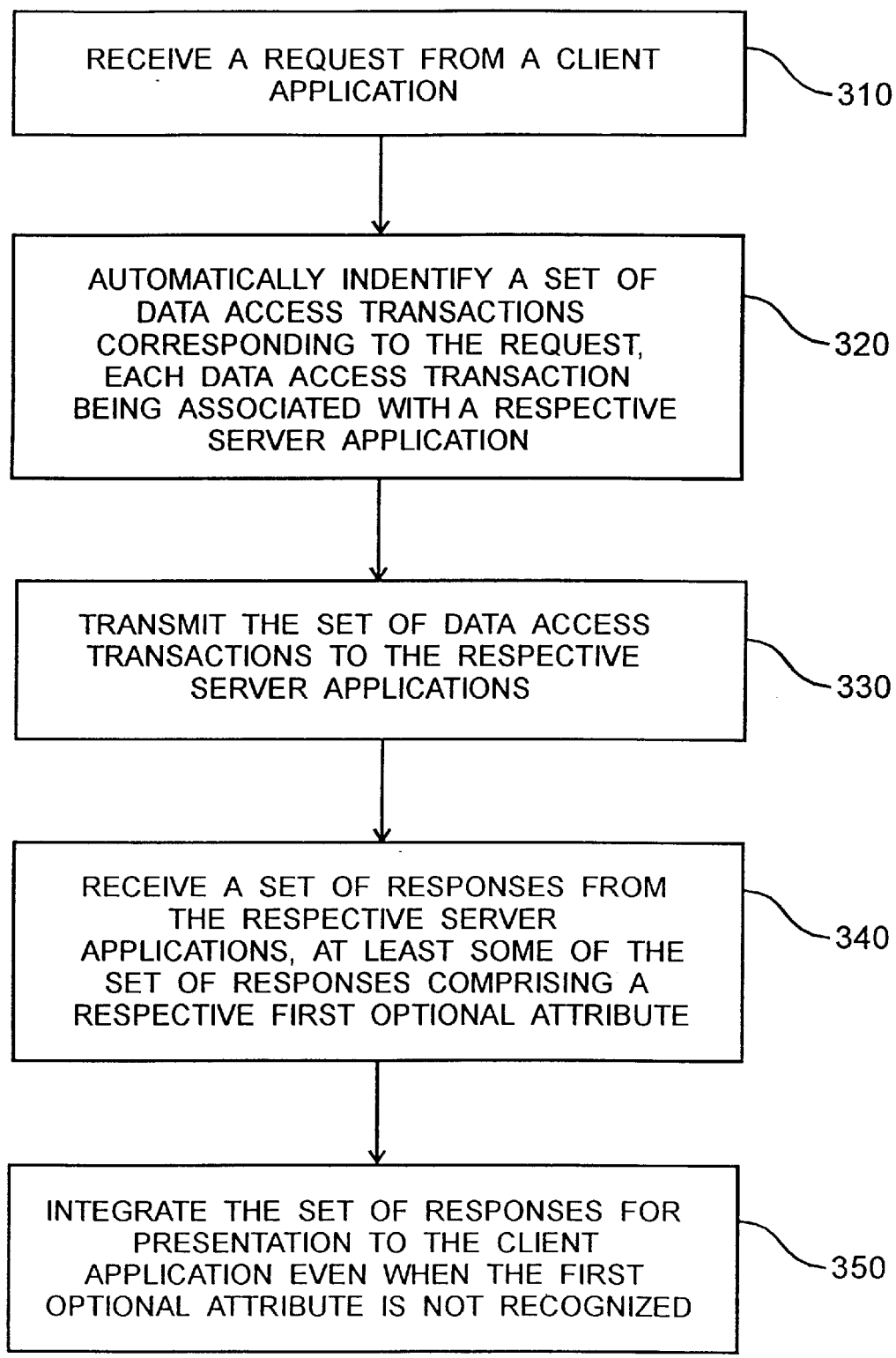
FIG. 3 is a flow chart of a method of a preferred embodiment for executing a request from a client application.

The first step in the method of FIG. 3 is receiving a request from a client application (step 310). Instead of transmitting several data access transactions, the client application 210 merely transmits a single request. Unlike typical network environments, in this network 200, the transmission from the client application 210 is a request for information, not a technical implementation of the request (i.e., a data access transaction). It is preferred that a web browser be used to enable the client application 210 to transmit input parameters to the gateway 220 in the form of an HTTP request. After the request is received, a set of data access transactions, each associated with a respective server application, is automatically identified (step 320). When a request from a client application 210 is received by the gateway 220, the data access transaction identification routine 224 identifies the technical implementation of the request by leveraging the process control tables 223. The tables 223 define the processing requirements of the client application's request and identify the data access transactions that must be executed to satisfy the request. Each data access transaction comprises two sections. The first section describes the message type, content, and format to define the data items present. The first section includes any navigation constraints, authority levels required for access, maximum size of input or output messages, presentation languages supported, and other general processing rules needed to communicate with a server application. The second section is the data itself (e.g., the input parameters). Any information items not specified as a required attribute of the request are optional items that may or may not be supported by a particular server application.

Next, the set of data access transactions are transmitted to the respective server applications (step 330). In contrast to networks using EDI interfaces which prevent client-server communication if a server application does not receive the exact data items it is expecting, the server applications of these preferred embodiments will process the set of data access transactions even in the presence of an additional optional attribute. That is, the interface syntax of these preferred embodiments dynamically defines the content of request-reply messages to allow processing of data access transactions even when a server application does not recognize an optional attribute. With this feature, new server applications can be added to the host environment 260 without coordinating their syntax and formatting requirements with the client application 210. In other words, the network 200 has release independence.

After the targeted server application processes the received data access transaction, the gateway 220 receives a set of responses from the respective server applications (step 340). The results returned from the server applications are parsed and placed in a common message structure. As with the data access transactions, at least some of the set of responses comprises an optional attribute. The response integration routine 226 integrates the set of responses for presentation to the client application 210 even when an optional attribute is not recognized (step 350). The response integration routine 226 sorts and merges the received information using the rules defined for processing the request. Output can be conditionally modified or reformatted using a set of string manipulation and conditional functions that are customizable and defined by the developer of the gateway 220. With the integrated responses, the integrated response presentation routine 227 accesses application presentation objects, which preferably dynamically builds an HTML page for return to the client application 210.

Figure 4:
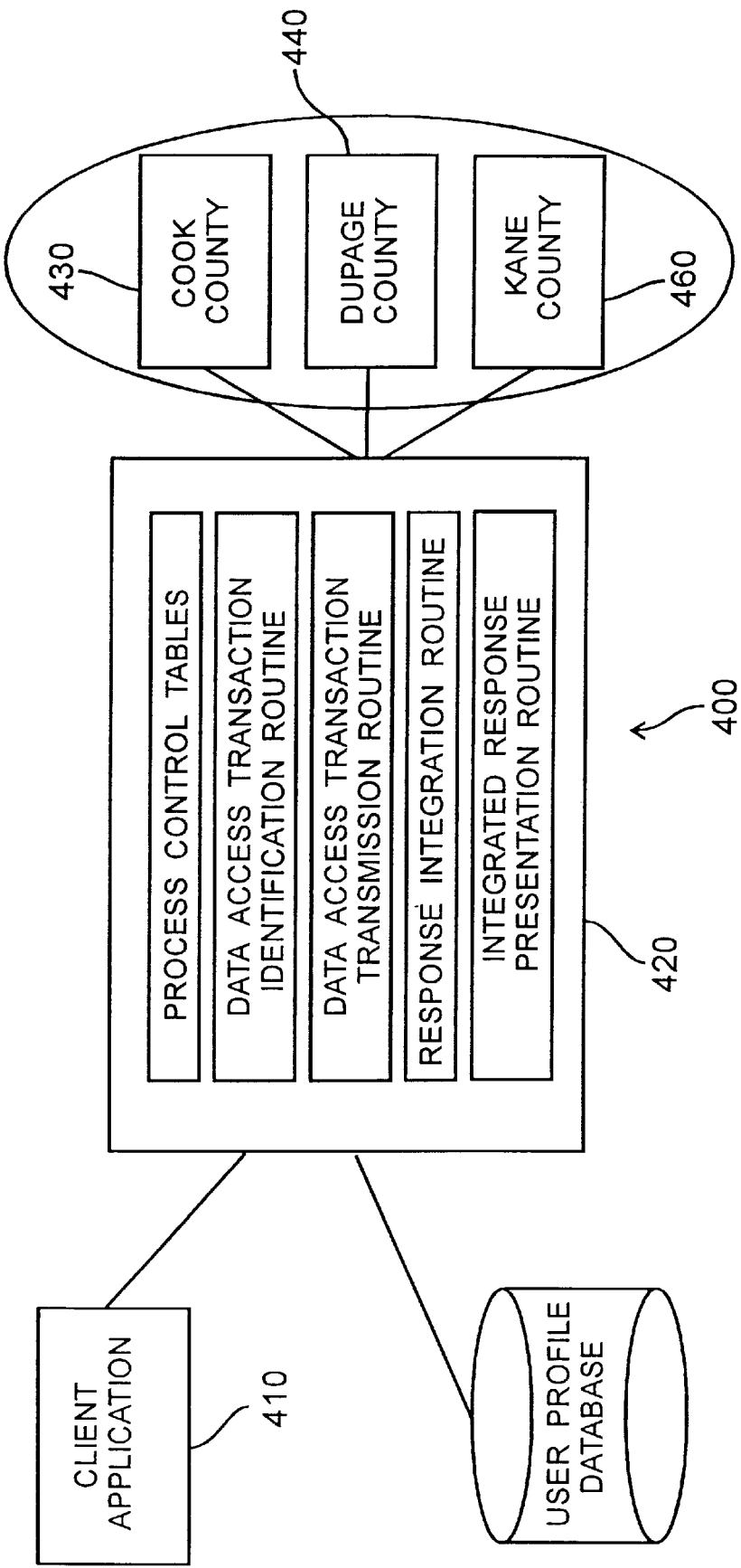
FIG. 4 is a block diagram of a network of another preferred embodiment.

The example described below will illustrate the principles developed above. FIG. 4 is a block diagram of a network 400 of a preferred embodiment that can be used to access government records for the State of Illinois. In this network 400, a client application 410 is coupled with a gateway 420, which is coupled with a server application for Cook County 430 and a server application for Du Page County 440. In this example, the request is "Felony Criminal Record Search by Name." The required input data item is last name, and the optional input data items are first name, middle name, middle initial, social security number ("SSN"), date of birth ("DoB"), and sex. The required output data items include last name, arrest date, and case number, and the optional output data items include first name, middle name, middle initial, SSN, DoB, and sex. Suppose that Cook County keeps a record of a person's SSN and Du Page County does not. When a data access transaction is sent to the Cook County and Du Page County server applications 430, 440, the Cook County server application 430 will use all of the data supplied to qualify its search for arrest records while the Du Page County server application 440 ignores the SSN data item but still processes the data access transaction. When the response integration routine receives responses from the servers, it merges the results and indicates to the client application 410 that the SSN data item is not applicable for Du Page County's arrest records.

Now suppose that Kane County, another county in Illinois, is added to the network 400 and that the Kane County server application 460 records and stores eye color as an attribute of the arrested party. Kane County writes its transaction to include eye color as an optional search criteria and returns this attribute in its reply to a "Felony Record Search by Name" request. If the client application 410 is modified to allow input of eye color before the Kane County server application 460 is made available on the network 400, the results from Cook County and Du Page County will indicate that eye color is a "not applicable" data attribute. If the process control tables have not been updated to include eye color, when eye color data is received from the client application 410, the eye color data item and value will be ignored. If Cook County or Du Page County decides to modify its processing to allow the search to include eye color, it can do so at a later date without notification to either the gateway 420 or the client application 410. A similar procedure occurs when the gateway 420 receives responses from the server applications. That is, the gateway 420 integrates the responses received from the server applications even when the responses contain unrecognizable data items (i.e., optional attributes).

In addition to the functions described above, the gateway 220 can incorporate security functionality. End users of the gateway 220 can be authorized to access one or more services through the use of user security profiles maintained in the user profile database 270. The database 270, which is preferably an Oracle 7 database, can be a part of or separate from the gateway 220. The method used to gain access to the gateway 220 depends on the client platform. For a dial-up gui application, Kerberos authentication services can be used. For a web-based client, SSL can be used to encrypt input user-id and password. It is important to note that any suitable authentication procedure can be used. Once authentication is complete, the user profile is used to create a menu of the services accessible by the client for that session.

Because the gateway 220 prevents direct connection between the client application 210 and the server applications 260, the gateway 220 acts as a firewall, adding an additional layer of security to the network 200. This firewall feature also simplifies the authentication and authorization process since security needs only be managed once (upon logging into the gateway 220), unlike conventional networks that require the client application to execute security procedures for each contacted server application.

In addition to containing authentication and authorization information, a user profile can contain information used in computing fees for the use of server applications. Fee schedules by user type or a subscription plan can be specified by each participating information provider. Because there are multiple information providers, the fees charged and revenue apportionment applicable to a server application may vary from one host to another. The gateway 220 maintains these relationships and tracks the hosts that are accessed for each request so that the appropriate fee can be charged and the correct distribution of revenue occurs. A complete record of the user's session can be maintained for auditing billing details.

The charges applied to a customer account can be based on the value of a transaction, subscription, or usage. Transaction- or usage-based charges can be dynamically computed and applied to accounts real-time, inputted on-line by authorized customer service representatives or agents, or batched and submitted via an import process using a standard external billings request file. Subscription charges are computed in a scheduled batch process based on the defined charge rules for the service and package configuration.

Charges are computed, and charged fees can be remitted to the appropriate information providers, distributors, and service providers using a flexible-service- or transaction-specific set of rules that provide, for example, fee schedules based on client type, charges based on subscription package, temporary sign-up promotions, association discounts, user discounts, and transaction charge schedules based on subscription package, minimum charge policy, and volume discounts.

Fees charged to end-users are apportioned to the entities involved in the provision or sale of the service. Flexible fee apportionment schedules are defined for each transaction, allowing information providers to participate in discount programs that ensure that statutory fees are remitted in full to government institutions. Electronic Funds Transfer can be used to transfer funds to recipients. Billing accounts can include pre-paid accounts, receivable accounts for which a bill is issued, or credit line accounts.

In the above-described embodiments, an end user initiated a request from the client application. In an alternative embodiment, the request is initiated by intelligent agent software, allowing peer-to-peer applications to use the gateway for inter-enterprise service requests. An intelligent agent is a set of objects that enable pre-defined standing requests or process initiated requests to be submitted to the gateway. Agent objects provide standard services that enable an application to pose a request, interpret the results, and either initiate another request or create a report or document using the results. That is, the business functions defined for use by the intelligent agent can be designed to interpret the results to format a second request to the gateway. When the response is posted to the results queue of the application, the content of the message will cause the application's results handler to transfer the message to the request queue for continued processing.

To create the software that will enable a network to perform as described above, a development tool can be used that, unlike conventional development tools that use physical mapping of a legacy system data model to a virtual data model, is based on the concept of separation of function. Application components can be viewed as belonging to one of three layers—presentation, processing, or data management. This view enables development staff to define, design, and construct application components independently, leveraging existing expertise and simplifying the process of heterogeneous system integration. Graphical tools can be provided to document the results of each development phase and generate design specifications, source code, and configuration specifications for use by the development staff.

First, the "service" is defined to the gateway. A "service" is a set of applications provided by a service provider. For each service, a description that will serve as the textual display on the provider's menu and a set of rules are defined to the system, Service level rules determine the languages the presentation developers will need to support (e.g., whether fees will be charged for the service). For each service, one or more business applications will be defined. An "application" contains a set of business tasks (the result of a business task is a returned HTML page) and the sequence in which the business tasks may be executed. This sequence is important for most applications since the result of one request will generally provide the input parameters for the next. Once the high level definition is complete, data analysts in the participating organizations define the logical data management functions required to support the business task. The definition includes a description of all input and output data items. Each input or output item is specified identifying, for example, whether the item is required for processing or optional, the maximum size of the item, the format of the item (e.g., date format=yyyymmdd), and the tag name by which this item will be identified. Processing constraints (i.e., sort requirements for output) and reportable error conditions and codes are also defined.

The definition of each data management function is stored in the process control tables and is used as input to the specification generation function that creates a specification report that, at this point in the design, can be handed off to the data management development teams who will design the procedures that will execute in the host environments. Business tasks can then be defined by selecting the appropriate logical data management functions required to satisfy the request, mapping the business function input items and output items to the corresponding item in the data management function definitions. As page design proceeds, data manipulation functions may be added to the task definition to aggregate data items for compression. The number of rows of detail data to be returned with each request and other processing details can also be added. After design approval, the gateway construction tools can be used to generate the standard application interface objects that may be included in the application programs being developed for data management and presentation. The target host environments and remote transaction identifiers are specified for each data management function. The format name for the HTML pages that will present the results of the business tasks are also specified. Once all of the required inputs have been provided, the development objects (e.g., source code for data management application interface, URLs for presentation links, configuration details for system administrators) can be generated. At this time, the system can also generate the updates to the processing control and application integration tables used by the gateway components.

It is preferred that the gateway be built upon an on-line transaction processing ("OLTP") foundation, which, in contrast to the store-and-forward mechanism used with EDI standards, provides real time interaction, guaranteed transaction delivery, and practically unlimited scalability. Differences in location and technology are configurable within the gateway platform so that the same logical request can be directed to one enterprise over an SNA network as a CICS transaction and to another as a remote procedure call to an Oracle database by routing the request through the appropriate data manager. Gateway services can be accessed by popular web browsers via standard HTTP requests using a CORBA compliant framework provided by, for example, Oracle's Web Server 3.0. Data access transactions can be executed using standard protocols or can use the protocols native to a server application. Application interfaces are provided to access CICS regions using LU62 over SNA networks. The appropriate published remote access API is used to access Oracle, Sybase, SQLServer or Informix stored procedures. Each routine preferably runs as a distinct UNIX process enabling the use of popular monitoring tools to alert operations personnel if a routine unexpectedly becomes inoperative.

It is intended that the foregoing detailed description be understood as an illustration of selected forms that the invention can take and not as a definition of the invention. For example, the methods described above can be implemented in a computer usable medium having computer readable program code means embodied therein. It is only the following claims, including all equivalents, that are intended to define the scope of this invention.

What is claimed is:

1. A method for executing a request from a client application, said method comprising the steps of:
   (a) receiving a request from a client application;
   (b) automatically identifying a set of data access transactions corresponding to said request, each data access transaction being associated with a respective server application;
   (c) transmitting said set of data access transactions to said respective server applications;
   (d) receiving a set of responses from said respective server applications, at least some of said set of responses comprising a respective first optional data item; and
   (e) integrating said set of responses for presentation to said client application, said step of integrating being performed even when said first optional data item is not recognized;
   wherein at least some of the set of data access transactions in step (b) comprise a second optional data item, and wherein the method further comprises the step of usincg said respective server applications to process said set of data access transactions even when said second optional data item is not recognized by said respective server applications.

2. The method of claim 1, further comprising the step of using a client application to transmit said request in response to user initiation.

3. The method of claim 1, further comprising the step of using a client application to transmit said request in response to intelligent agent software initiation.

4. The method of claim 1, wherein step (a) is performed by a web browser.

5. The method of claim 1, further comprising the steps of:
   (f) receiving user identification information from said client application; and
   (g) accessing a user profile database to verify said received user identification information.

6. The method of claim 1, further comprising the steps of:
   (f) accessing a user profile database to compute a fee for using said respective server applications.

7. A computer usable medium having computer readable program code means embodied therein for executing a request from a client application, the computer readable program code means comprising:
   first computer readable program code means for receiving a request from a client application;
   second computer readable program code means for automatically identifying a set of data access transactions corresponding to said request, each data access transaction being associated with a respective server application;
   third computer readable program code means for transmitting said set of data access transactions to said respective server applications;
   fourth computer readable program code means for receiving a set of responses from said respective server applications, at least some of said set of responses comprising a respective first optional data item; and
   fifth computer readable program code means for integrating said set of responses for presentation to said client application, said step of integrating being performed even when said first optional data item is not recognized;
   wherein said set of data access transactions comprises a second optional data item, and wherein the medium further comprises sixth computer readable program code means for processing said set of data access transactions even when said second optional data item is not recognized by said respective server applications.

8. A system for facilitating communication between a client application and a plurality of server applications, said system comprising:
   first means for receiving a request from a client application;
   second means for automatically identifying a set of data access transactions corresponding to said request, each data access transaction being associated with a respective server application;
   third means for transmitting said set of data access transactions to said respective server applications;
   fourth means for receiving a set of responses from said respective server applications, at least some of said set of responses comprising a respective first optional data item; and
   fifth means for integrating said set of responses for presentation to said client application, said step of integrating being performed even when said first optional data item is not recognized;
   wherein said set of data access transactions comprises a second optional data item, and wherein the system further comprises sixth means, located in said respective server applications, for processing said set of data access transactions even when said second optional data item is not recognized by said respective server applications.

9. The invention of claim 8, wherein said request transaction is initiated by a user.

10. The invention of claim 8, wherein said request transaction is initiated by intelligent agent software.

11. The invention of claim 8, further comprising:
    a user profile database coupled with said client application and comprising user identification information; and
    sixth means for accessing said user profile database to verify received user identification information.

12. The invention of claim 8, further comprising:
    a user profile database coupled with said client application and comprising fee information; and
    sixth means for accessing said user profile database to compute a fee for using said respective server applications.

* * * * *